United States Patent
Kikuchi et al.

(10) Patent No.: US 6,279,091 B1
(45) Date of Patent: *Aug. 21, 2001

(54) PROGRAM EXECUTION ENVIRONMENT SPECIFICATION METHOD AND A RECORDING MEDIUM CONTAINING THE METHOD RECORDED THEREIN

(75) Inventors: Toshiki Kikuchi; Yasuhiko Yokote, both of Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,523

(22) Filed: Apr. 9, 1998

(30) Foreign Application Priority Data

Apr. 15, 1997 (JP) .................................................. 9-097744

(51) Int. Cl.$^7$ ...................................................... G06F 12/00
(52) U.S. Cl. ............................................ 711/170; 707/206
(58) Field of Search .................................... 711/170, 173; 707/200, 205, 206

(56) References Cited

U.S. PATENT DOCUMENTS 5,129,083 * 7/1992 Cutler et al. .......................... 707/200

OTHER PUBLICATIONS

Knuth, D. Fundamental Algorithms vol. 1, Addison Wesley, 1997:232–273.*

Goodheart et al. The magic garden explained. Prentice Hall, 1994: 232–281.*

* cited by examiner

Primary Examiner—Do Hyun Yoo
Assistant Examiner—Yamir Encarnación
(74) Attorney, Agent, or Firm—Jay H. Maioli

(57) ABSTRACT

The present invention provides a program execution environment specification method capable of carrying out effective management of resources used for execution of a program. When a command to specify allocation of an area to store a logical address is issued, firstly, an address space structure is allocated as an area to store the logical address and an execution space structure is allocated to store an information of an area for sled execution. Next, a pointer to the address space structure is stored in a pointer to the execution space structure, and the pointer to the execution space structure is linked to a list of the pointer to the address space structure. After this, a sled structure is allocated as an area to store a sled information, the pointer to the execution space structure is stored in the pointer to the sled structure, and the pointer to the sled structure is linked to the list of the pointer to the execution space structure.

18 Claims, 17 Drawing Sheets

PROGRAM EXECUTION ENVIRONMENT SPECIFICATION METHOD AND A RECORDING MEDIUM CONTAINING THE METHOD RECORDED THEREIN

BACKGROUND OF THE INVENTION

1. Field of the Invention

The present invention relates to a program execution environment specification method capable of carrying out an effective management of resources through abstraction of a program execution environment and a recording medium containing the method recorded thereon.

2. Description of the Prior Art

For effective management of resources used for executing a program by a computer, an application program interface (API) is indispensable for handling a program execution environment such as an address space, memory area, sled execution area, and the like. It should be noted that the API is a set of commands used for interfacing an application with a computer, from which a command is fetched when a basic function of an operating system is to be used by an application program.

Conventionally, an API which handles a program execution environment through abstraction normally carries out management of a program execution environment on a process basis. One process is related to one logical address, so that a plurality of sleds can be executed in one process.

However, a conventional API cannot be said to be capable of sufficiently effectively carrying out management of resources used for program execution.

SUMMARY OF THE INVENTION

It is therefore an object of the present invention to provide a program execution environment specification method capable of effective management of resources used for program execution and a recording medium containing a program for realizing such a program execution environment specification method.

In order to achieve the aforementioned object, the present invention introduces into the API an address space structure for handling an environment of memory resources through abstraction and an execution space structure for handling an environment of CPU resources through abstraction.

That is, in the program execution environment specification method according to the present invention, when a command is issued which specifies an area allocation to store a logical address, the following steps are executed: a step of allocating an address space structure as an area to address the logical address; a step of allocating an execution space structure as an area to store an information of an area for sled execution; a step of storing an address space structure pointer in an execution space structure pointer; a step of linking the execution space structure pointer to a list of the address space structure pointer; a step of allocating a sled structure as an area to store a sled information; a step of storing the execution space structure pointer in the sled structure pointer; and a step of linking the sled structure pointer to the list of the execution space structure pointer.

In the aforementioned program execution environment specification method according to the present invention, an address space structure is allocated as an area to store a logical address; an execution space structure is allocated as an area to store an information of an area for sled execution; and a sled structure is allocated as an area to store sled information. This enables separate management of an area to store a logical address, an area to store information of an area for sled execution, and an area to store a sled information. Moreover, the relationships between the address space structure, the execution space structure, and the sled structure are defined by pointers and accordingly, it is also possible to carry out the management interrelating them with one another.

Moreover, the recording medium according to the present invention contains a program. which carries out the following steps when a command is issued to allocate an area to store a logical address: a step of allocating an address space structure as an area to address the logical address; a step of allocating an execution space structure as an area to store an information of an area for sled execution; a step of storing an address space structure pointer in an execution space structure pointer; a step of linking the execution space structure pointer to a list of the address space structure pointer; a step of allocating a sled structure as an area to store a sled information; a step of storing the execution space structure pointer in the sled structure pointer; and a step of linking the sled structure pointer to the list of the execution space structure pointer.

In the aforementioned program recorded on the recording medium according to the present invention, an address space structure is allocated as an area to store a logical address; an execution space structure is allocated as an area to store an information of an area for sled execution; and a sled structure is allocated as an area to store sled information. This enables separate management of an area to store a logical address, an area to store information of an area for sled execution, and an area to store a sled information. Moreover, the relationships between the address space structure, the execution space structure, and the sled structure are defined by pointers and accordingly, it is also possible to carry out the management interrelating them with one another.

DETAILED DESCRIPTION OF PREFERRED EMBODIMENTS

Hereinafter, description will be directed to embodiments of the present invention with reference to the attached drawings.

Firstly, explanation will be given on a configuration example of a computer system according to the present invention.

Figure 1:
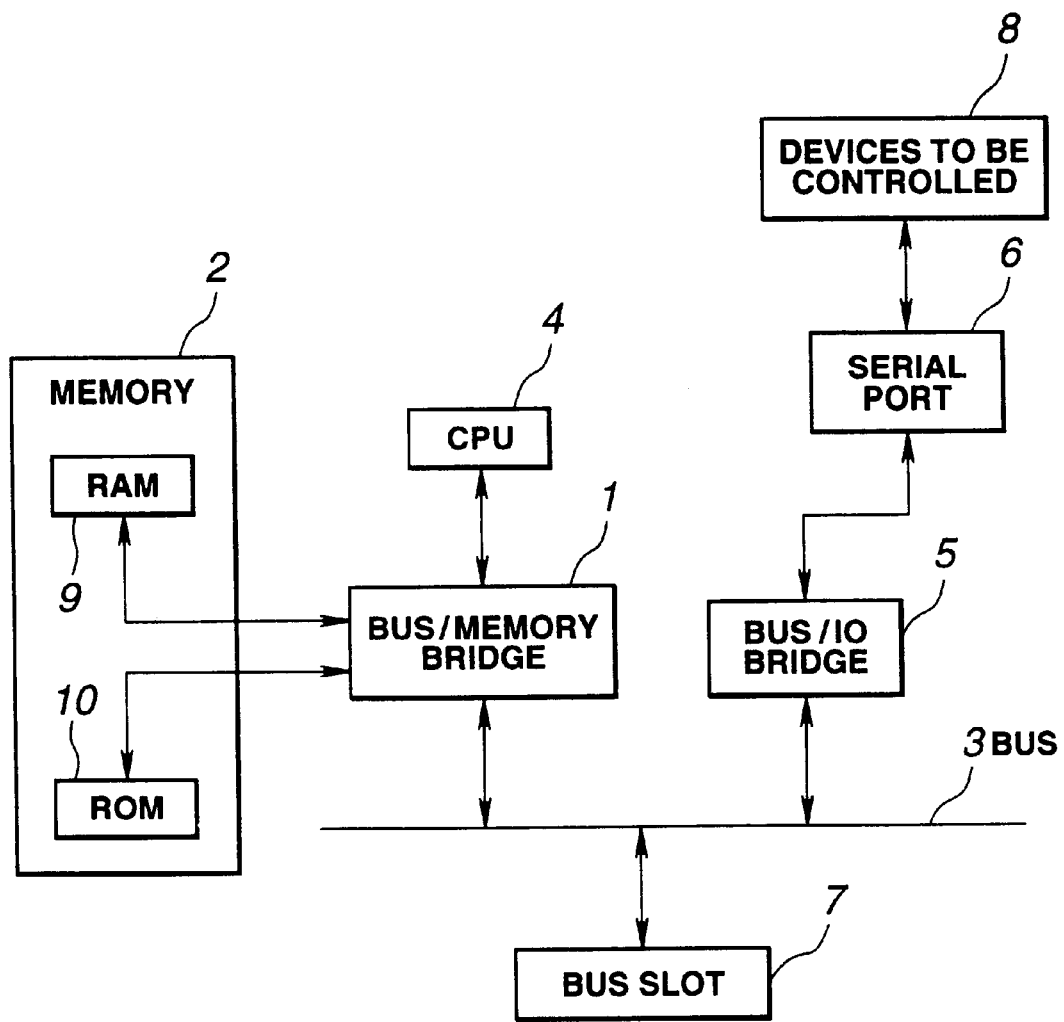
FIG. 1 is a block diagram showing an example of a computer system according to the present invention.

This computer system is built in an AV (audio and visual) apparatus such as a video tape recorder, video disc player, audio tape recorder, or audio disc player, and carries out control of the AV apparatus. As shown in FIG. 1, this computer system includes a central processing unit (CPU) 4 connected through a bridge 1 to a memory 2 and a bus 3; a serial port 6 connected through a bridge 5 to the bus 3; and a bus slot 7 connected to the bus 3, wherein a signal can be transmitted and received through the bus 3.

The CPU 4 carries out computations for controlling the AV apparatus having this computer system as a built-in system. The serial port 6 is connected to devices to be controlled 8 of the AV apparatus having this built-in computer system and through this serial port 6, signals required for control are transmitted between the computer system and the devices to be controlled 8. The bus slot 7 is a slot to be used when extending a function. When extending the function of the computer system or the AV apparatus, an apparatus required for extending the function is connected to this bus slot 8.

The memory 2 includes a random access memory (RAM) 9 which is a rewritable memory device and a read only memory (ROM) 10 which is dedicated for read out. The CPU 4 reads out a data from the RAM 9 or ROM 10 through the bridge 1 and, if necessary, writes a data through the bridge 1 into the RAM 9. Here, the ROM 10 contains an operating system and the like for basic management of this computer system stored in advance, whereas the RAM 9 contains an application program required for controlling the AV apparatus. Note that it is also possible to store the application program required for controlling the AV apparatus, in the ROM 10.

The computer system has the aforementioned basic configuration. However, the computer system according to the present invention is not to be limited to the aforementioned configuration and can include components other than the above-mentioned. That is, the computer system according to the present invention may include a communication apparatus such as a modem or a terminal adapter; an external memory apparatus such as a hard disc apparatus, a flexible disc apparatus, a magnetic tape apparatus, or the like; a display apparatus such as a CRT display and a liquid crystal display; or an output apparatus such as a printer and a plotter.

Moreover, the aforementioned computer system has been explained as a built-in system in an AV apparatus. However, the present invention is not to be limited to a computer system for controlling an AV apparatus and can be applied to a computer system for various applications. It should be noted that the present invention enables to effectively use resources such as a memory and exhibits an especially great merit when applied to a small-size computer which requires to effectively use limited resources.

Next, explanation will be given on a program execution environment specification method carried out in the aforementioned computer.

In the program execution environment specification method which will be described below, it is possible to specify an execution environment in an address space unit, in an execution space unit, and in a sled unit.

Here, the address space represents a memory resource environment abstracted, serving as a field for region mapping. It should be noted that a region means a memory area. In a region, a physical memory area is abstracted to be handled. That is, a region is specified by using a logical address. Moreover, the mapping means to makes it possible that a physical memory area can be accessed from a CPU by using a logical address.

Moreover, a region is mapped in at least one address space. A region is deleted when all the address spaces which have been mapped disappear from this region. That is, there is no region which is not mapped in any address space.

On the other hand, the execution space is a CPU resource environment abstracted, serving as a field where a sled exits. Here, a sled represents an execution context of a program to be executed and can be said to be a CPU operation abstracted. The execution context shows a data configuration which has saved an execution state.

Figure 2:
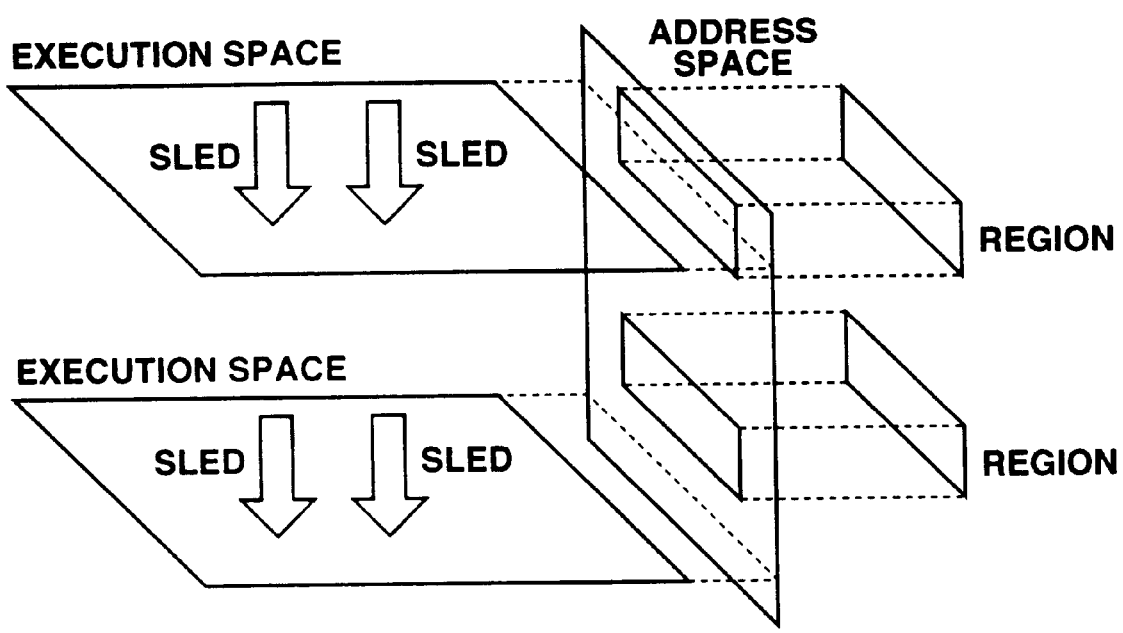
FIG. 2 schematically shows an example of a program execution environment specified according to the present invention.
Figure 3:
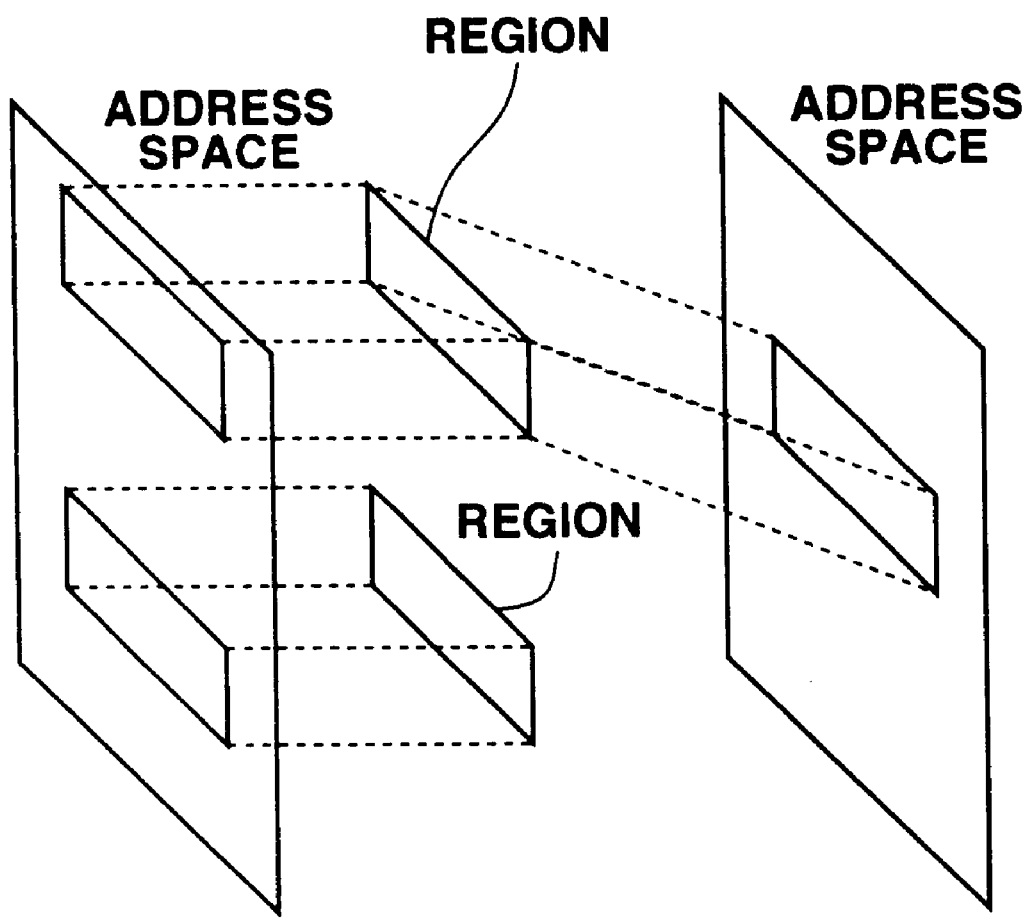
FIG. 3 schematically shows another example of a program execution environment specified according to the present invention.

When an address space is created, one region is assured, which is mapped on the address space. Consequently, an address space always contains at least one region mapped, and the address space is deleted when no region is present. That is, there is no address space containing no region mapped. It should be noted that it is possible to map a plurality of regions on an address space. For example, as shown in FIG. 2, it is possible to map two regions on one address space. Moreover, it is possible to map one region on a plurality of address spaces. For example, as shown in FIG. 3, it is possible to map one region on two address spaces. It should be noted that in FIG. 3 an execution space and sled are omitted.

Moreover, when an address space is created, for the address space, one execution space is always assured. Consequently, one address space always corresponds to at least one execution space. The address space is deleted when the execution space corresponding to this address space has disappeared. There is no address space not related to any execution space. It should be noted that it is possible to relate one address space with a plurality of execution spaces. For example, as shown in FIG. 2, it is possible to relate one address space with two execution spaces.

On the other hand, when an execution space is created, one sled is automatically created to be contained in this execution space. Consequently, an execution space always contains at least one sled. The execution space is deleted when all the sleds contained in this execution space have disappeared. That is, there is no execution space without a sled. It should be noted that one execution space can contain a plurality of sleds. For example, as shown in FIG. 2, two sleds can exist in one execution space.

Moreover, when an address space is deleted, all the execution spaces corresponding to this address space are deleted, and furthermore, all the sleds contained in the execution space deleted are also deleted. Moreover, a region which has been mapped on the address space is released from mapping. If the address space on which the region is mapped has disappeared, the region is also deleted.

On the other hand, when an execution space is deleted, all the sleds contained on the execution space are also deleted. Here, the address space related to the execution space deleted is also deleted when all the execution spaces related to this address space have disappeared.

The aforementioned program execution environment specification enables to specify an execution environment in the address space unit, in the execution space unit, and in the sled unit, which enables to extremely effectively carry out management of resources used for a program execution. That is, it is possible to fetch only a resource required for a program execution, enabling more detailed resource management.

Moreover, address spaces, execution spaces, sleds, and regions are interrelated so that unnecessary ones are automatically deleted. Consequently, there will not arise a problem that a resource used for a program execution remains fetched upon completion of a program. This enables to effectively and accurately use resources. The same applies upon abnormal completion of a program. When a program terminates abnormally, resources are sure to be released. Consequently, even when a program has terminated abnormally, it is possible to effectively and accurately use resources.

Next, explanation will be given on a specific embodiment for realizing the aforementioned program execution environment specification.

Here, as an API for realizing the aforementioned program execution environment and interfacing between an operating system executed in a computer system and an application program executed on the operating system, a class 'address space', a class 'execution space', and a class 'sled' are defined in advance and saved on a recording medium. It should be noted that the embodiment explained here is a case of the present invention using an object-oriented programming, and the 'class' is an overall definition of a data configuration in an object and a method describing its operation.

The class 'address space' has as methods Address Space Creation and Address Space Deletion; the class 'execution space' has as methods Execution Space Creation, Execution Space Deletion, Execution Space Interruption, and Execution Space Resumption; the class 'sled' has as methods Sled Creation, Sled Deletion, Sled Interruption, and Sled Resumption. That is, in this embodiment, the aforementioned program execution environment is specified by calling these methods.

Figure 4:
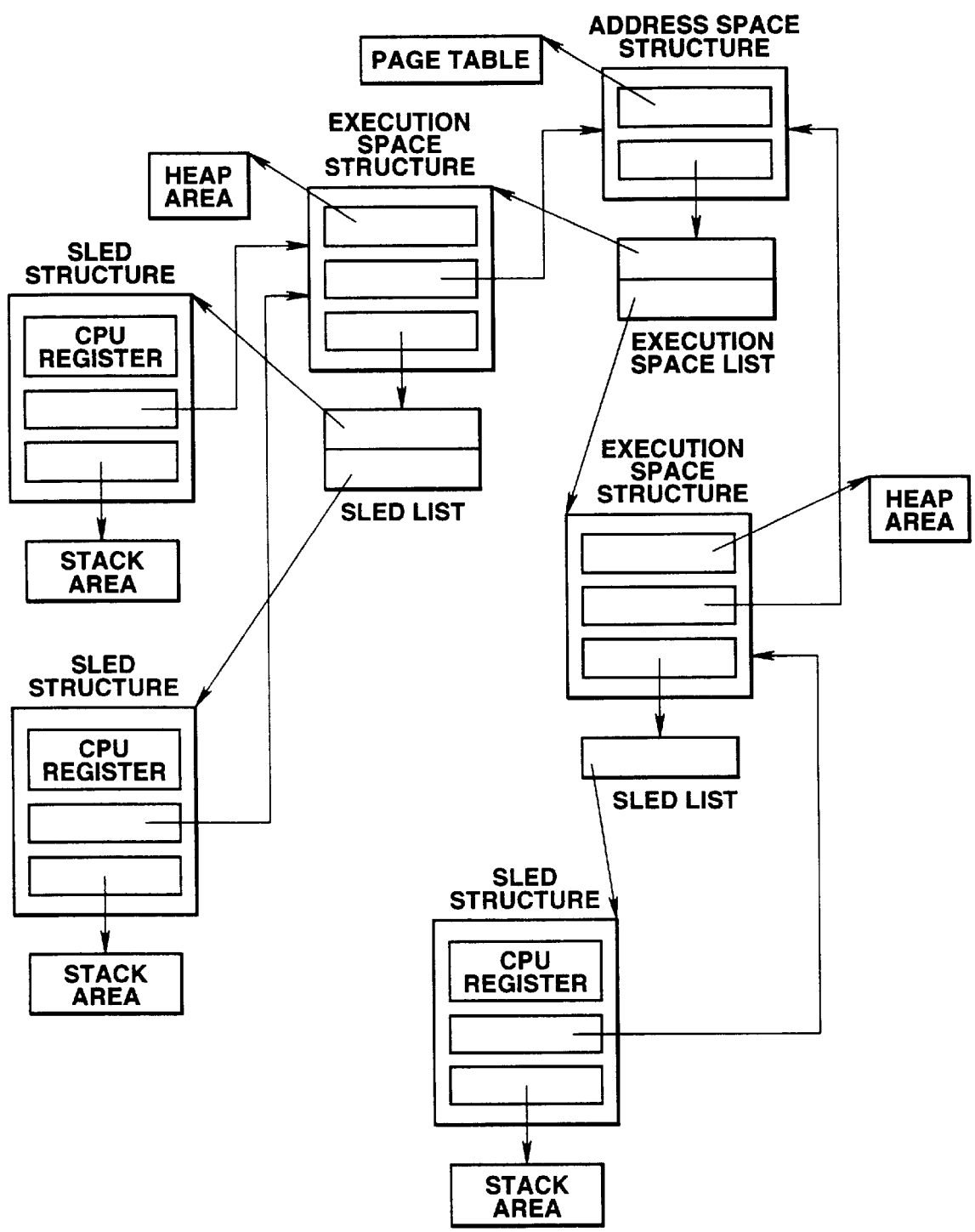
FIG. 4 schematically shows a list configuration of a structure used in an embodiment of the present invention.

Hereinafter, a detailed explanation will be given on these methods. Note that FIG. 4 schematically shows a list configuration of an address space structure, an execution space structure, a sled structure, and the like used in these methods. Here, the address space structure corresponds to the aforementioned address space, and the execution space structure corresponds to the aforementioned execution space, and the sled structure corresponds to the aforementioned sled.

It should be noted that the recording medium according to the present invention contains a program for setting a program execution environment by executing the methods which will be detailed below and this program can be read by a computer. Here, the type of the recording medium is not limited to a particular one, and may be a memory built in a computer system or may be a recording medium such as a magnetic tape, magnetic disc, a magneto-optical disc, or an optical disc.

Address Space Creation

The method Address Space Creation corresponds to a command which specifies allocation of an area to store a logical address and as arguments, a heap area size and a stack size are passed. That is, when allocating an area to store a logical address, the method Address Space Creation is called and a heap area size and a stack size are passed as arguments.

Figure 5:
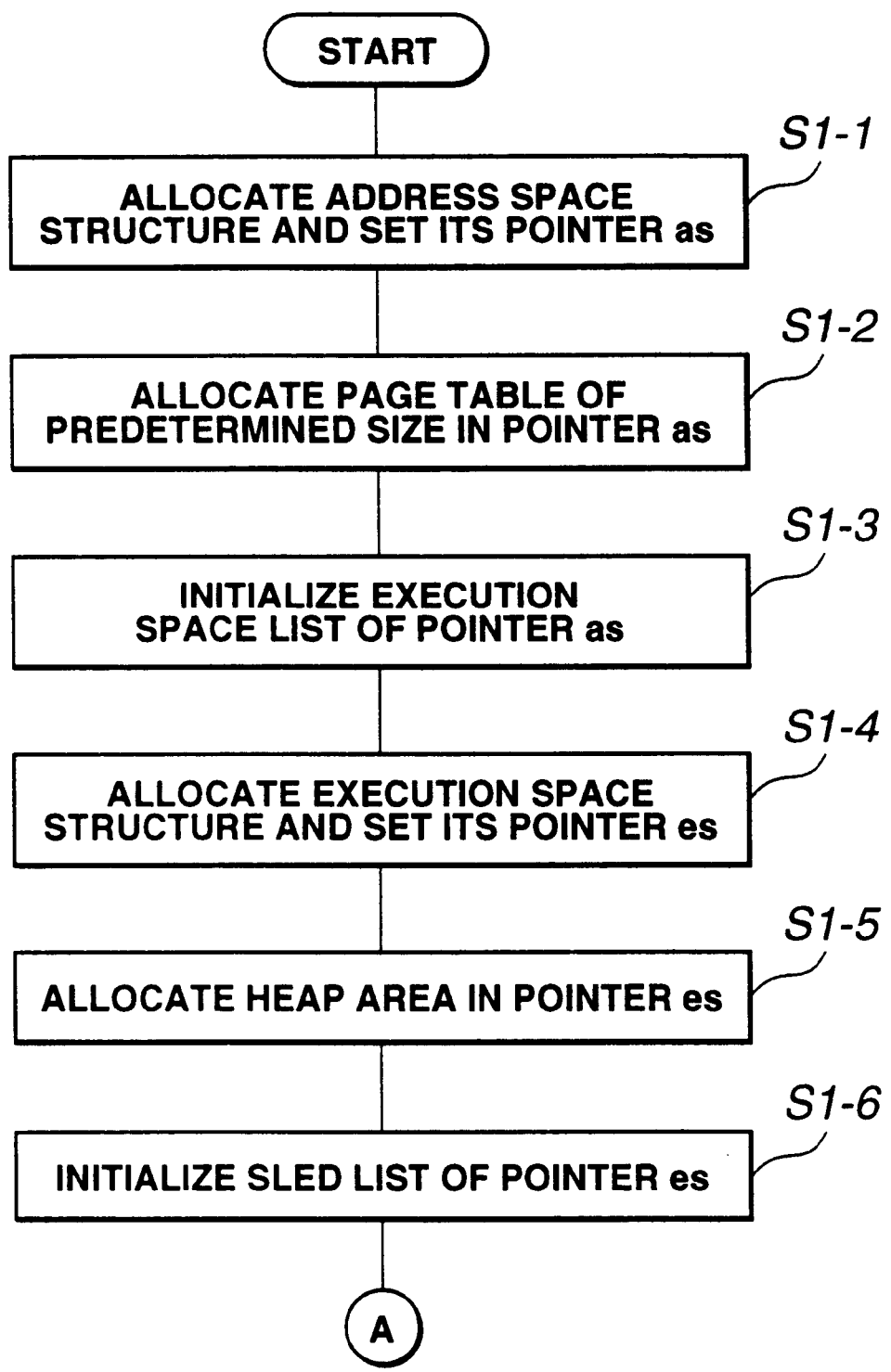
FIG. 5 is a flowchart showing Address Space Creation.
Figure 6:
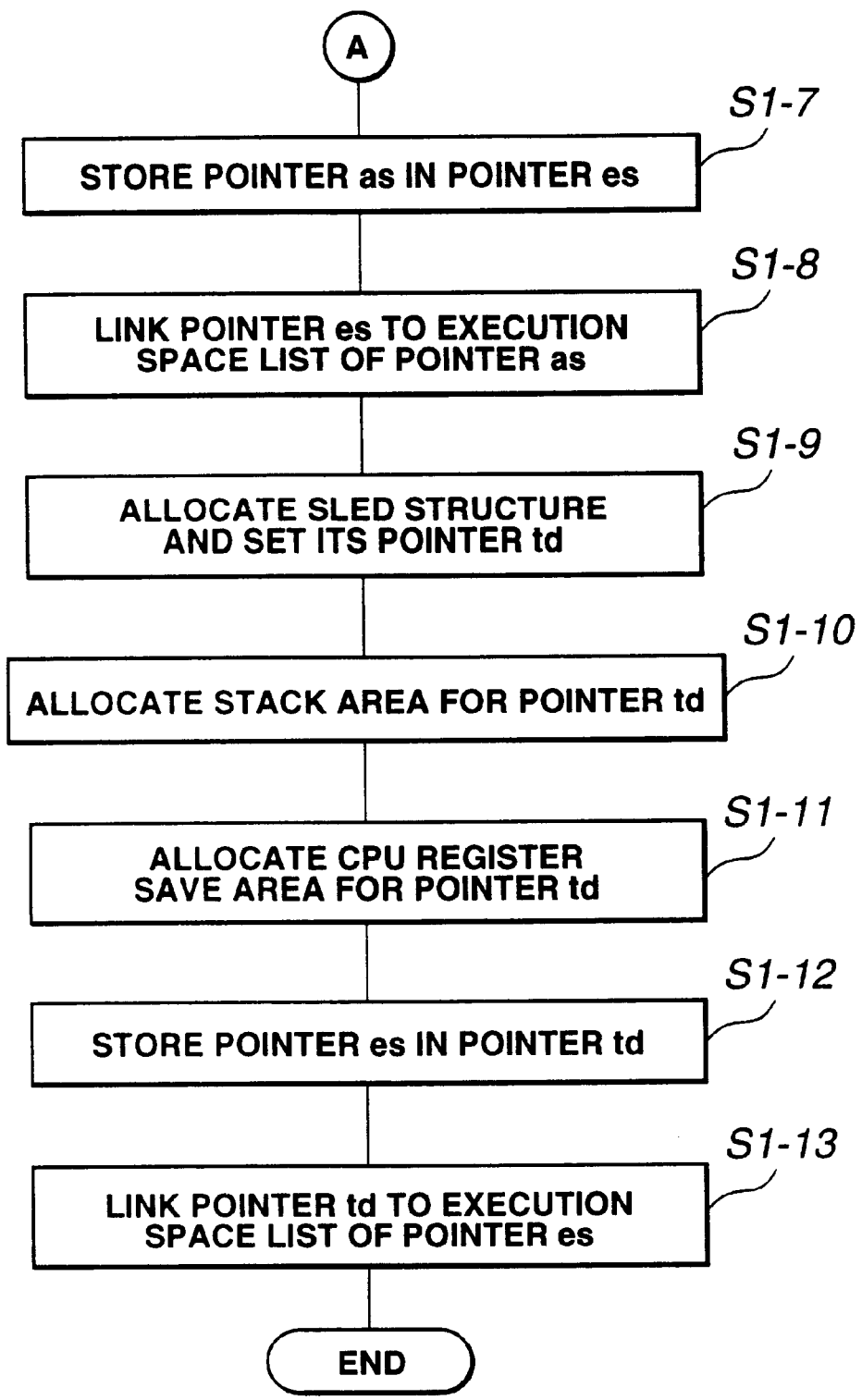
FIG. 6 is a flowchart showing Address Space Creation.

When the method Address Space Creation is called, as shown in a flowchart of FIGS. 5 and 6, firstly in step S1-1, an address space structure is allocated as an area to store a logical address and its pointer 'as' is set. Here, for the pointer 'as' to the address space structure, there is provided an execution space list for linking with a pointer 'es' to an execution space structure which will be described later.

Next, in step S1-2, for the pointer 'as' to the aforementioned address space structure, a page table of a predetermined size is allocated.

Next, in step S1-3, the execution space list of the pointer 'as' to the aforementioned address space structure is initialized.

Next, in step S1-4, an execution space structure is allocated as an area to store an information of an area for sled execution and its pointer 'es' is set. Here, for the pointer 'es' to the execution space structure, there is provided a sled list for linking with a pointer 'td' to a sled structure which will be described later.

Next, in step S1-5, for the pointer 'es' to the aforementioned execution structure, a heap area of the heap area size passed as an argument is allocated.

Next, in step S1-6, the sled list of the pointer 'es' to the aforementioned execution space structure is initialized.

Next, in step S1-7, the pointer 'as' to the aforementioned address space structure is stored in the pointer 'es' to the aforementioned execution space structure.

Next, in step S1-8, the pointer 'es' to the aforementioned execution space structure is linked to the execution list of the pointer 'as' to the aforementioned address space structure.

Next, in step S1-9, a sled structure is allocated as an area to store a sled information and its pointer 'td' is set.

Next, in step S1-10, for the pointer 'td' to the aforementioned sled structure, a stack area of the stack size passed as an argument is allocated.

Next, in step S1-11, for the pointer 'td' to the aforementioned sled structure, a CPU register save area is allocated.

Next, in step S1-12, the pointer 'td' to the aforementioned sled structure stores the pointer 'es' to the aforementioned space structure.

Next, in step S1-13, the pointer 'td' to the aforementioned sled structure is linked to the execution space list of the pointer 'es' to the aforementioned execution space structure.

By carrying out the aforementioned processes, an address space structure is created as an area to store a logical address. Simultaneously with this, an execution space structure is created as an area to store an information of an area for sled execution, and a sled structure is created as an area to store a sled information. The address space structure, the execution space structure, and the sled structure are interrelated to form a so-called list configuration. That is, when an address structure is created, simultaneously with this, an execution space structure linked to the address space structure and a sled structure linked to this execution space structure are created.

Address Space Deletion

The method Address Space Deletion corresponds to a command to specify release of an area allocated for an address space structure and as an argument, a pointer 'as' to an address space structure of the area to be released is passed. That is, when releasing an area allocated for a particular address space structure, the method Address Space Deletion is called and the pointer 'as' to the address space structure whose area is to be released is passed as an argument.

Figure 7:
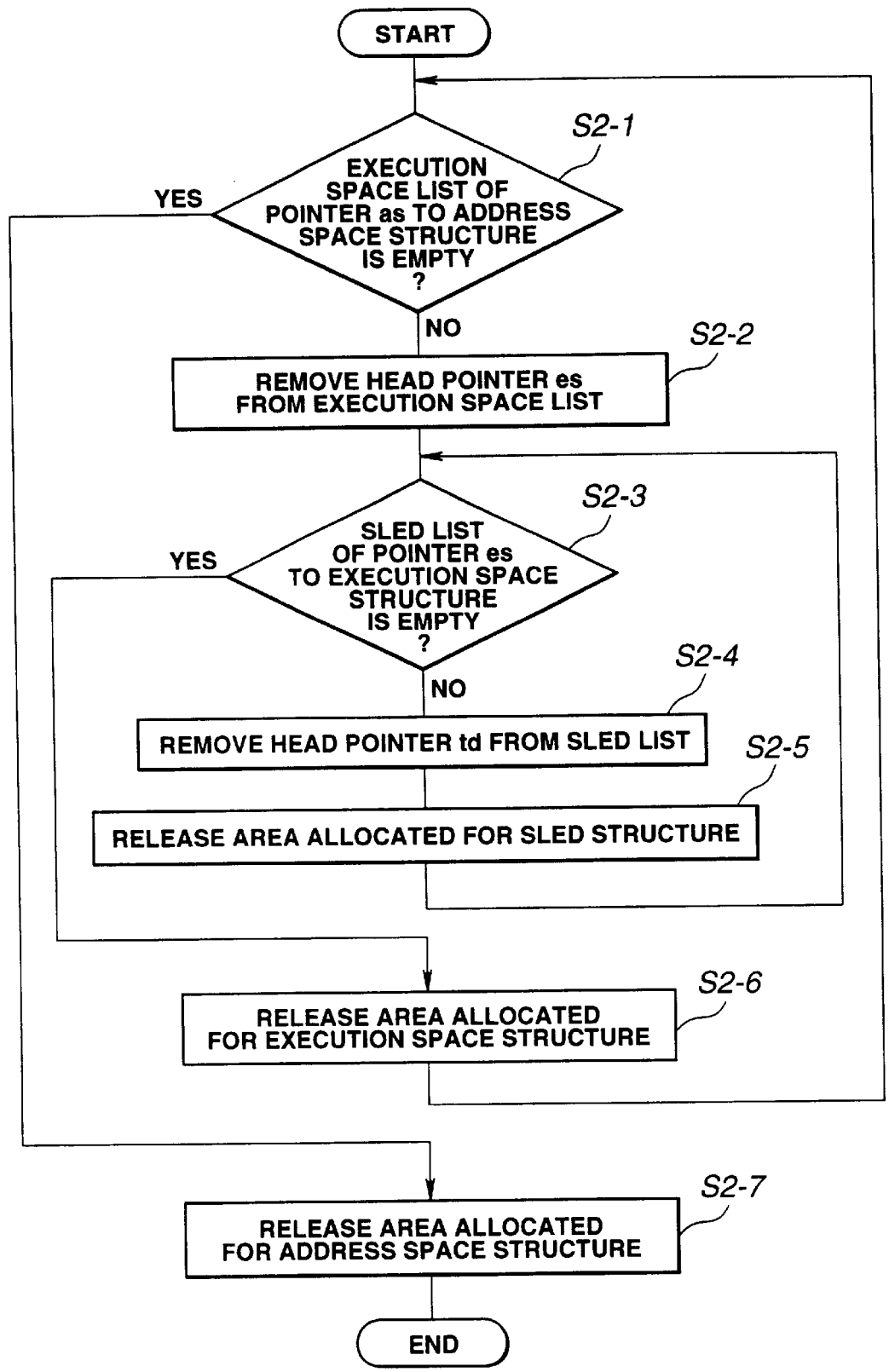
FIG. 7 is a flowchart showing Address Space Deletion.

When the method Address Space Deletion is called, as shown in a flowchart of FIG. 7, firstly, in step S2-1, it is determined whether the execution space list of the pointer 'as' passed as an argument, i.e., the pointer as to the address space structure whose area is to be released, is empty. That is, it is determined whether the address space structure is linked to an execution structure. Unless the execution space list is empty, control is passed to step S2-2, and if the execution space list is empty, control is passed to step S2-7. In step S2-2, from the execution space list of the pointer 'as' to the aforementioned address space structure, the first pointer 'es' to the execution space structure is removed.

Next, in step S2-3, it is determined whether the sled list of the pointer 'es' to the execution space structure removed from the execution space list in step S2-2 is empty. That is, it is determined whether the execution space structure is linked to a sled structure. Unless the sled list is empty, control is passed to step S2-4, and if the sled list is empty, control is passed to step S2-6.

In step S2-4, from the sled list of the pointer 'es' to the aforementioned execution space structure, the first pointer 'td' to the sled structure is removed.

Next, in step S2-5, the area allocated for the sled structure pointed by the pointer 'td' removed from the sled list in step S2-4 is released to extinguish the sled structure. After this, control is returned to step S2-3 to repeat the processing.

In step S2-6, the area allocated for the execution space structure pointed by the pointer 'es' removed from the execution space list in step S2-2 is released to extinguish the execution space structure. After this, control is returned to step S2-1 to repeat the processing.

In step S2-7, the area allocated for the address space structure whose area is to be released is released to extinguish the address space structure. When the area allocated for the address space structure is, the processing is complete.

Figure 8:
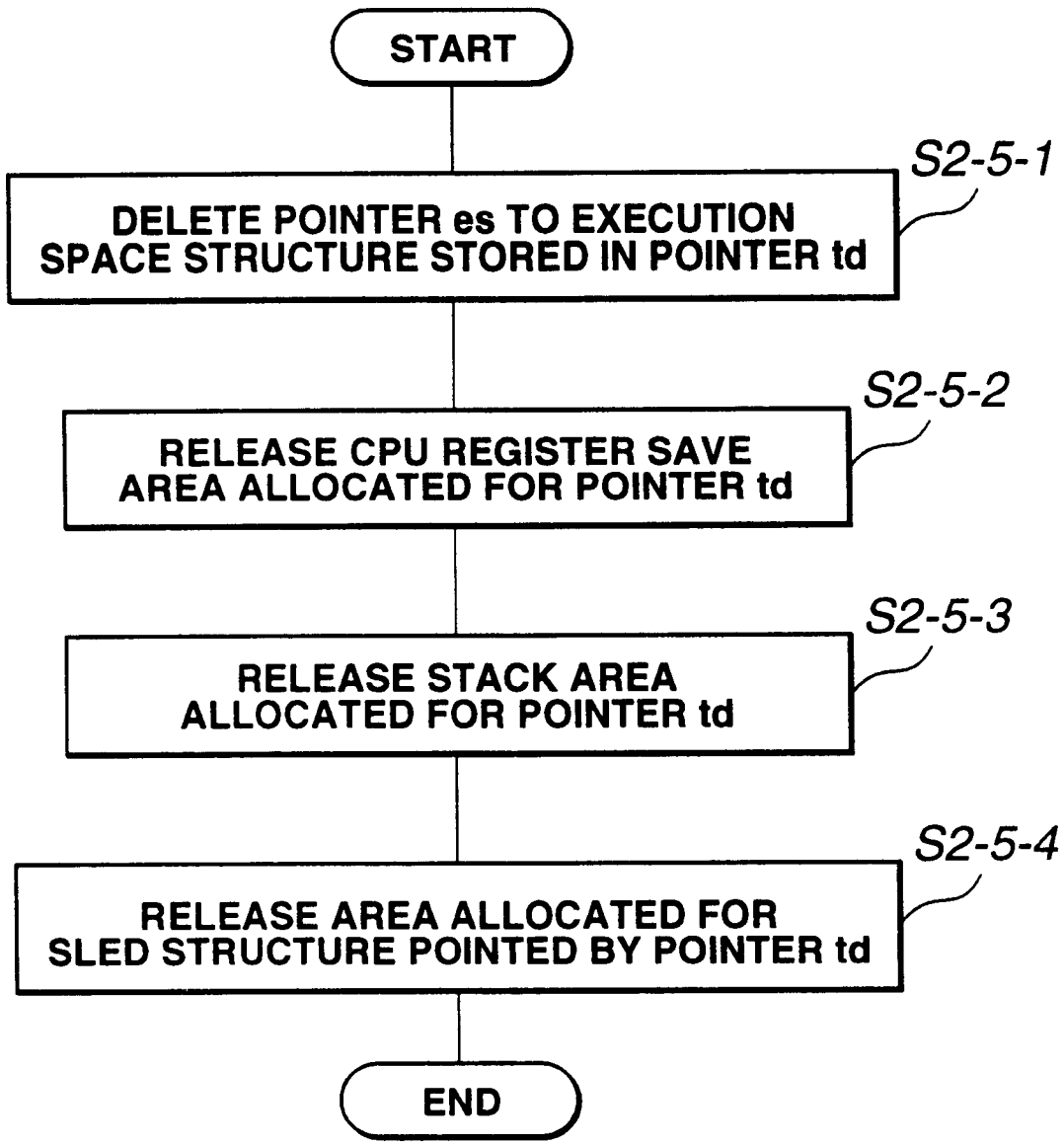
FIG. 8 is a flowchart showing a procedure of releasing a sled structure area.

It should be noted that when releasing the area allocated for the sled structure in step S2-5, as shown in a flowchart of FIG. 8, firstly, in step S2-5-1, the pointer 'es' to the execution space structure stored in the pointer 'td' removed from the sled list in step S2-4 is deleted. Next, in step S2-5-2, the CPU register save area allocated for the pointer 'td' removed from the sled list in step S2-4 is released. Next, in step S2-5-3, the stack area allocated for the pointer 'td' removed from the sled list in step S2-4 is released. After this, in step S2-5-4, the area allocated for the sled structure pointed by the pointer 'td' removed from the sled list in step S2-4 is released.

Figure 9:
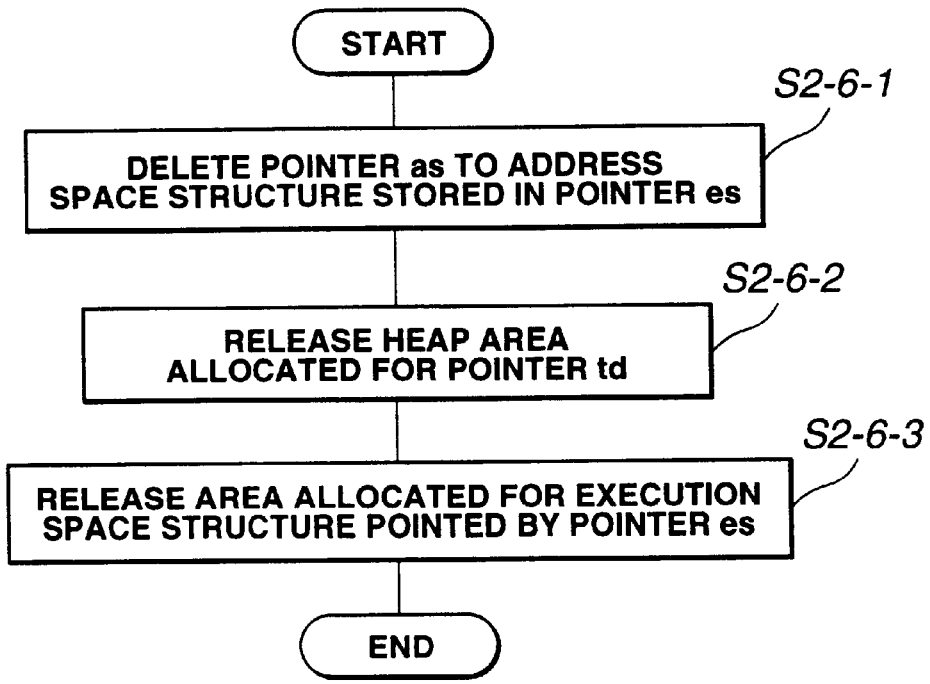
FIG. 9 is a flowchart showing a procedure of releasing an execution space structure area.

Moreover, when releasing the area allocated for the execution space structure in step S2-6, as shown in a flowchart of FIG. 9, firstly, in step S2-6-1, the pointer 'as' to the address space structure stored in the pointer 'es' removed from the execution space list in step S2-2 is deleted. Next, in step S2-6-2, the heap area allocated for the pointer 'td' removed from the execution space list in step S2-2 is released. After this, in step S2-6-3, the area allocated for the execution space structure pointed by the pointer 'es' removed from the execution space list in step S2-2 is released.

Figure 10:
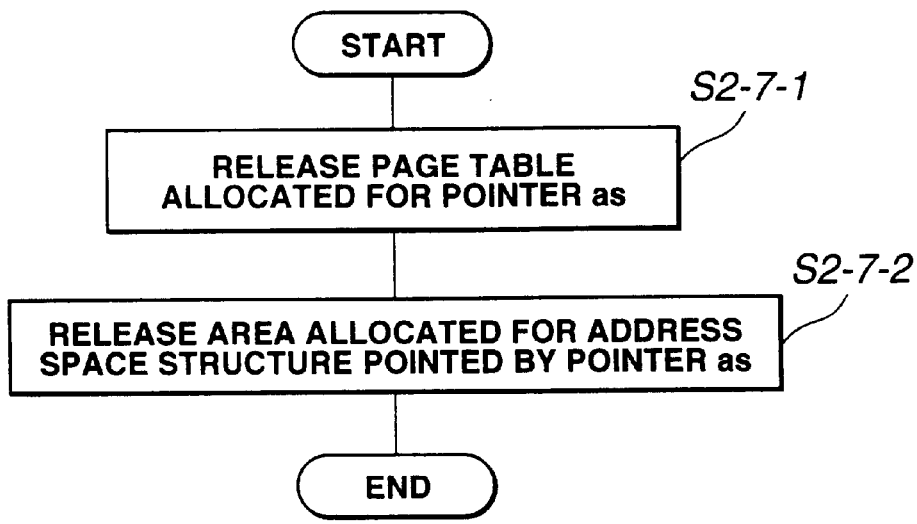
FIG. 10 is a flowchart showing a procedure of releasing an address space structure area.

Moreover, when releasing the area allocated for the address space structure in step S2-7, as shown in a flowchart of FIG. 10, firstly, in step S2-7-1, the page table allocated for the pointer 'as' to the address space structure whose area is to be released is released. After this, in step S2-7-2, the area allocated for the address space structure pointed by the pointer 'as' to the address space structure whose area is to be released is released.

As has been described above, the area which has been allocated for an address space structure is released, extinguishing the address space structure. Besides, in this process, the areas allocated for all the execution space structures corresponding to this address space structure are released, extinguishing those execution space structures, and furthermore, the areas allocated for all the sled structures corresponding to those execution space structures are released, extinguishing all these sled structures.

When an address space structure is extinguished by carrying out such a processing, there will not be a case when an execution space structure and a sled structure which have become unnecessary when the address space structure is extinguished continue to remain. Consequently, there is no danger that a memory resource is assigned for an unnecessary execution space structure and an unnecessary sled structure, thus enabling to effectively use resources.

Execution Space Creation

The method Execution Space Creation corresponds to a command to specify allocation of an area to store an information of an area for sled execution and a heap area size and a stack size are passed as arguments. That is, when allocating an area to store an information of an area for sled execution, the method Execution Space Creation is called and an area size and a stack size are passed as arguments.

Figure 11:
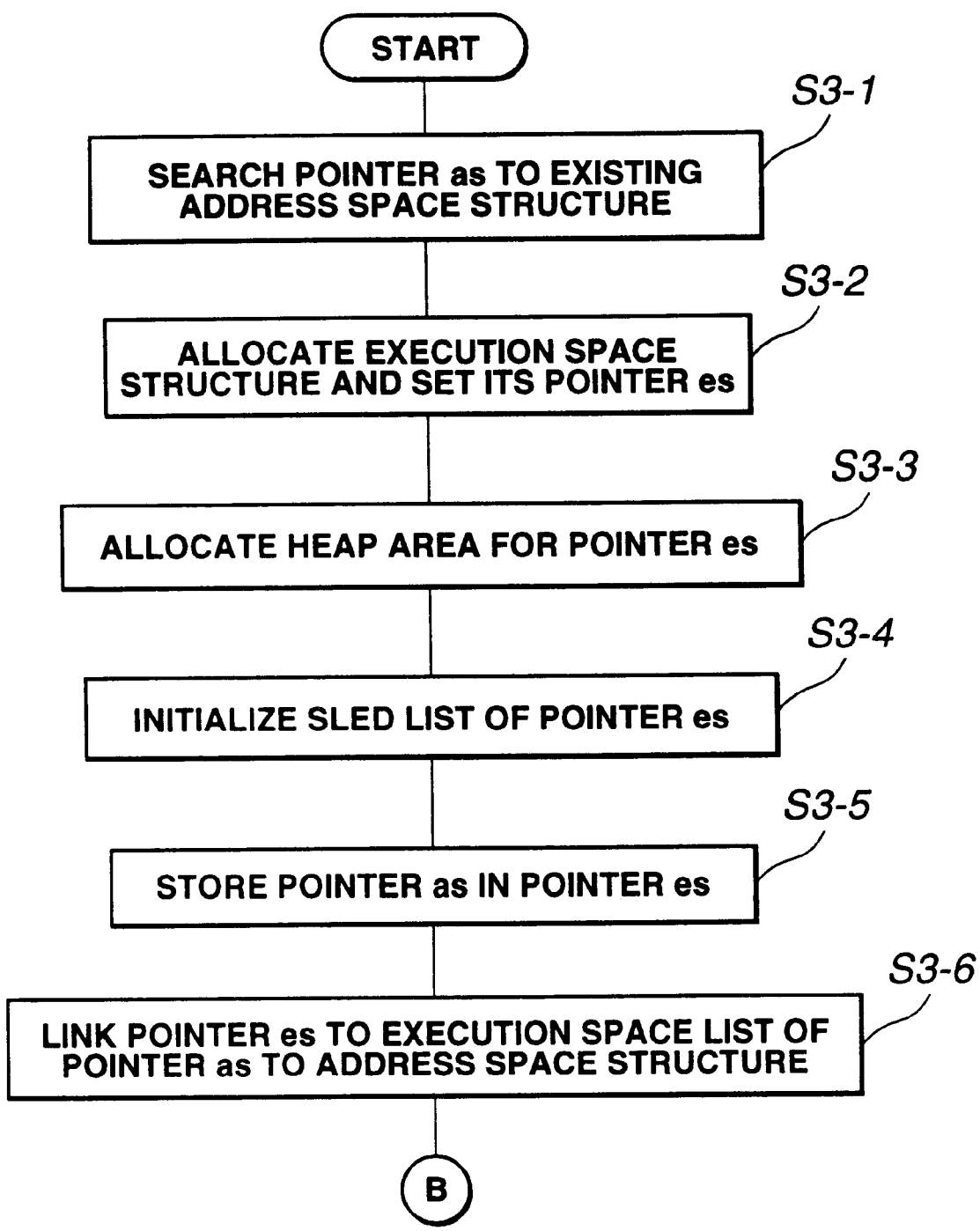
FIG. 11 is a flowchart showing Execution Space Creation.
Figure 12:
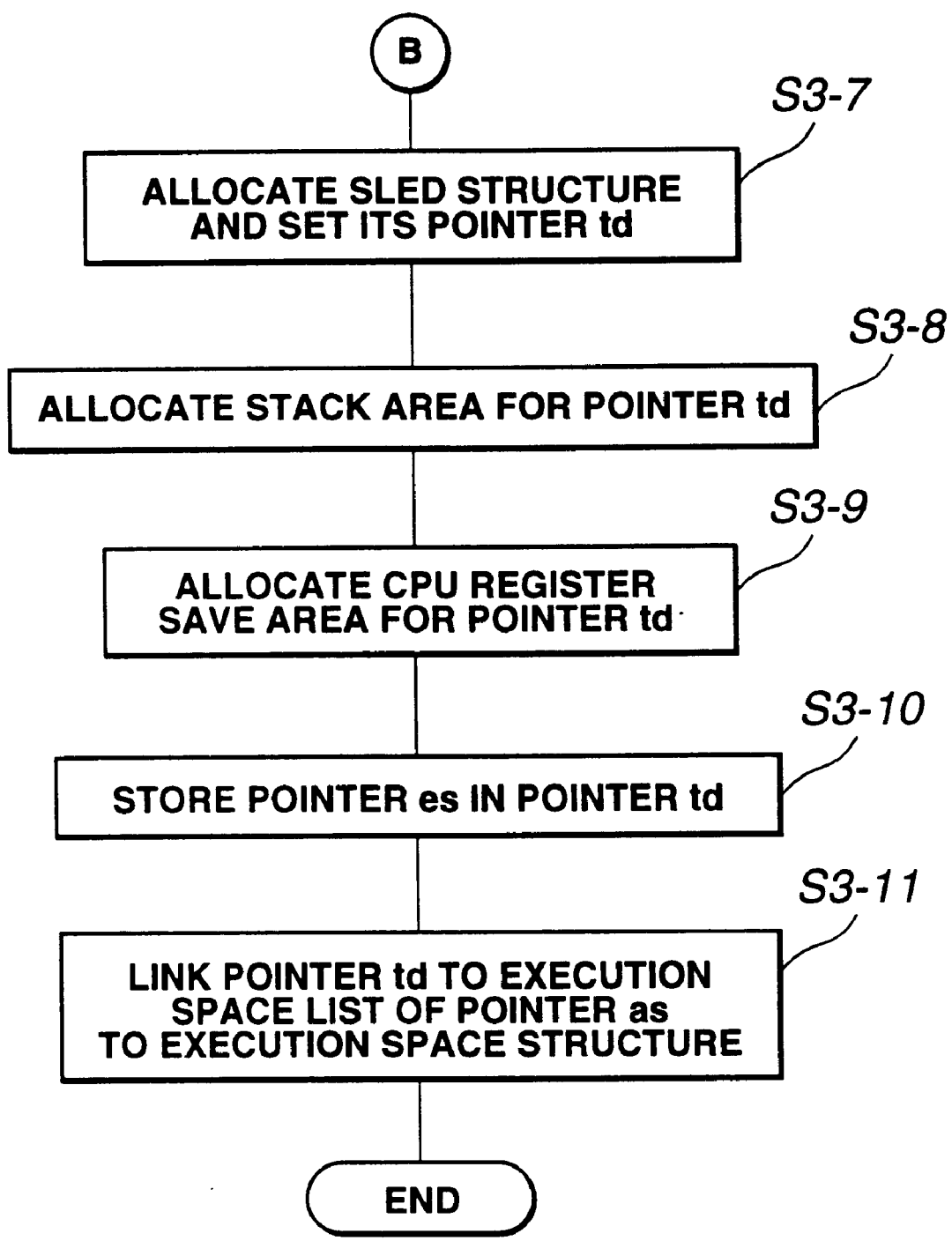
FIG. 12 is a flowchart showing Execution Space Creation.

When the method Execution Space Creation is called, as shown in a flowchart of FIG. 11 and FIG. 12, firstly, in step S3-1, the pointer 'as' to an existing address space structure to be related to an execution space structure to be created by this method of Execution Space Creation is searched.

Next, in step S3-2, an execution space structure is allocated as an area to store an information of an area for sled execution and its pointer 'es' is set. Here, for the pointer 'es' to the execution space structure, there is provided a sled list for linking to a pointer 'td' to a sled structure which will be detailed later.

Next, in step S3-3, for the pointer 'es' to the aforementioned execution space structure, a heap area of the heap area size passed as an argument is allocated.

Next, in step S3-4, the sled list of the pointer 'es' to the aforementioned execution space structure is initialized.

Next, in step S3-6, the pointer 'es' to the aforementioned execution space structure is linked to the execution space list of the pointer 'as' to the aforementioned address space structure.

Next in step S3-7, a sled structure is allocated as an area to store a sled information and its pointer 'td' is set.

Next, in step S3-8, for the pointer 'td' to the aforementioned sled structure, a stack area of the stack size passed as an argument is allocated.

Next, in step S3-9, a CPU register save area is allocated in the pointer 'td' to the aforementioned sled structure.

Next, in step S3-10, the pointer 'es' to the aforementioned execution space structure is stored in the pointer 'td' to the aforementioned sled structure.

Next, in step S3-11, the pointer 'td' to the aforementioned sled structure is linked to the execution space list of the pointer to the aforementioned execution space structure.

By the aforementioned processing, as an area to store an information of an area for sled execution, an execution space structure is created corresponding to an existing address space structure. Moreover, simultaneously with this, a sled structure is created as an area to store a sled information. The address space structure, the execution space structure, and the sled structure are interrelated so as to form a so-called list configuration. That is, when an execution space structure is created, the execution space is linked to an existing address space and a sled structure is created so as to be linked to this execution space structure.

Execution Space Deletion

The method Execution Space Deletion corresponds to a command to specify release of an area allocated for an execution space structure and a pointer 'es' to the execution space structure whose area is to be released is passed. That is, when releasing an area allocated for a particular execution space structure, the method of Execution Space Deletion is called and the pointer 'es' to the execution space structure whose area is to be deleted is passed as an argument.

Figure 13:
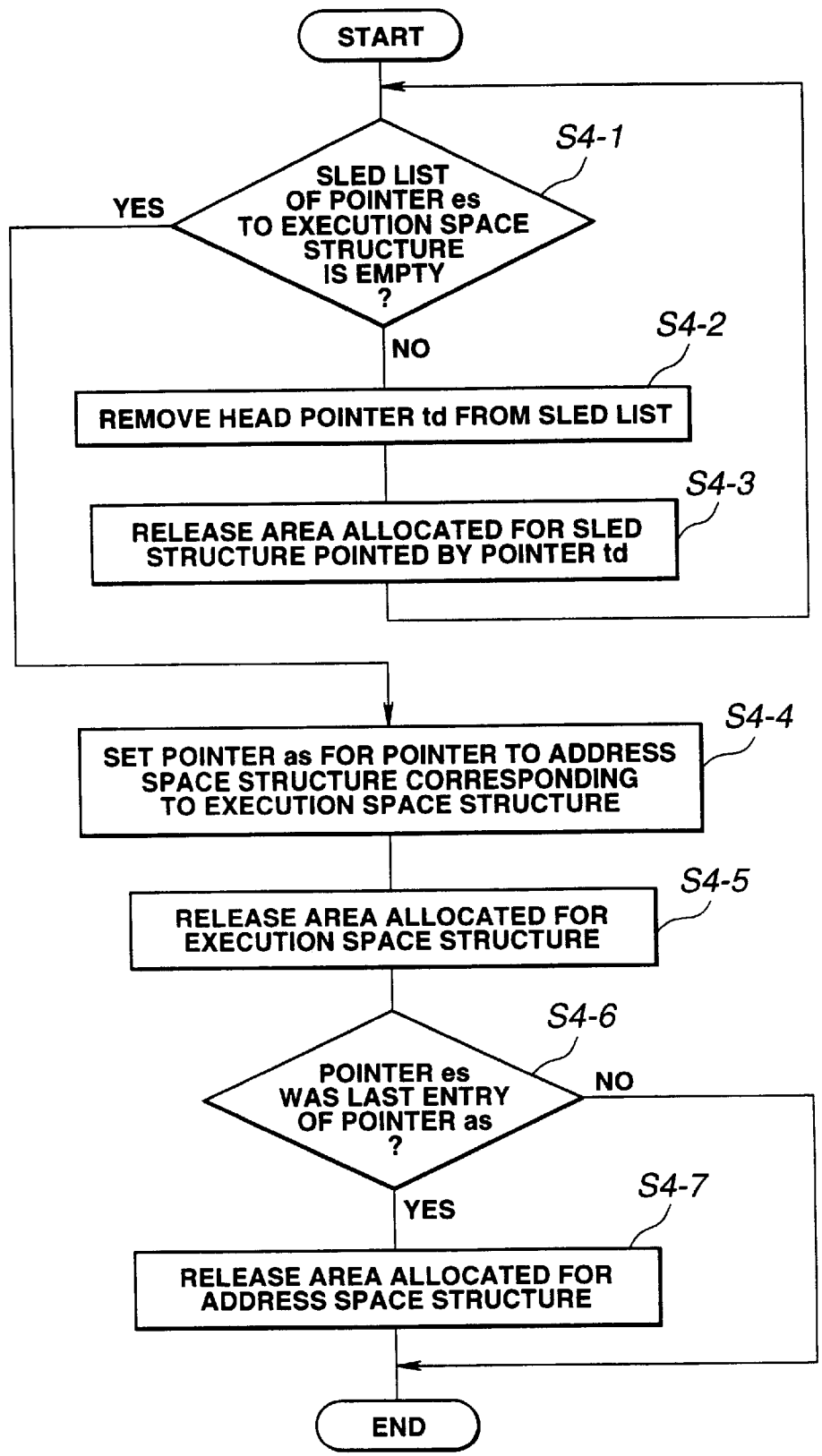
FIG. 13 is a flowchart showing Execution Space Deletion.

When the method Execution Space Deletion is called, as shown in a flowchart of FIG. 13, firstly, in step S4-1, it is determined whether the sled list of the pointer 'es' passed as an argument, i.e., the pointer 'es' to the execution space structure whose area is to be released is empty. That is, it is determined whether the execution space structure is linked to any sled structure. Unless the sled list is empty, control is passed to step S4-2, and if the sled list is empty, control is passed to step S4-4.

In step S4-2, from the sled list of the pointer 'es' to the aforementioned execution space structure, the first pointer 'td' to the sled structure is removed.

Next, in step S4-3, the area allocated for the sled structure pointed by the pointer 'td' removed from the sled list in step S4-2 is released, extinguishing the sled structure. Note that this processing is identical to the processing of the aforementioned steps S2-5-1 to S2-5-4. After this, control is returned to step S4-1 to repeat the processing.

In step S4-4, the pointer 'as' is set as a pointer to the address space structure corresponding to the aforementioned execution space structure.

Next, in step S4-5, the area allocated for the aforementioned execution space structure whose area is to be released is released, extinguishing the execution space structure. Note that this processing is identical to the processing of the aforementioned steps S2-6-1 to S2-6-3.

Next, in step S4-6, it is determined whether the pointer 'es' to the execution space structure extinguished in step S4-5 was the last entry of the pointer 'as' set in step S4-4. If the pointer 'es' was the last entry, control is passed to step S4-7 and if not the last entry, the processing is terminated.

In step S4-7, the area allocated for the address space structure pointed by the pointer 'as' set in step S4-4 is released, extinguishing the address space structure. Note that this processing is identical to the processing of the aforementioned steps S2-7-1 to S2-7-2. When the area allocated for the address space structure is released, the processing is terminated.

The aforementioned processing releases the area allocated to an execution space structure, extinguishing the execution space structure. Besides, in this processing, all the areas allocated for the sled structures corresponding to this execution space structure are released, extinguishing the sled structures. Besides, if the extinction of the execution space structure brings about a case that all the corresponding execution space structures are extinguished from the address space structure corresponding to this execution space structure, the area allocated for this address space structure is also released, extinguishing this address space structure.

Thus, when the execution space structure is extinguished, the related sled structures and the related address space structure are also extinguished, thus eliminating a danger of an unnecessary address space structure and a sled structure remaining. Consequently, there is no danger of allocating a resource such as a memory for an unnecessary address space structure or an unnecessary sled structure, which enables to effectively use resources.

Execution Space Interruption

The method Execution Space Interruption corresponds to a command to specify interruption of execution of a sled corresponding to a particular execution space structure, and a pointer 'es' to the execution space structure to be interrupted is passed as an argument. That is, when interrupting execution of a sled corresponding to a particular execution space structure, the method Execution Space Interruption is called and the pointer 'es' to the execution space structure is passed as an argument.

Figure 14:
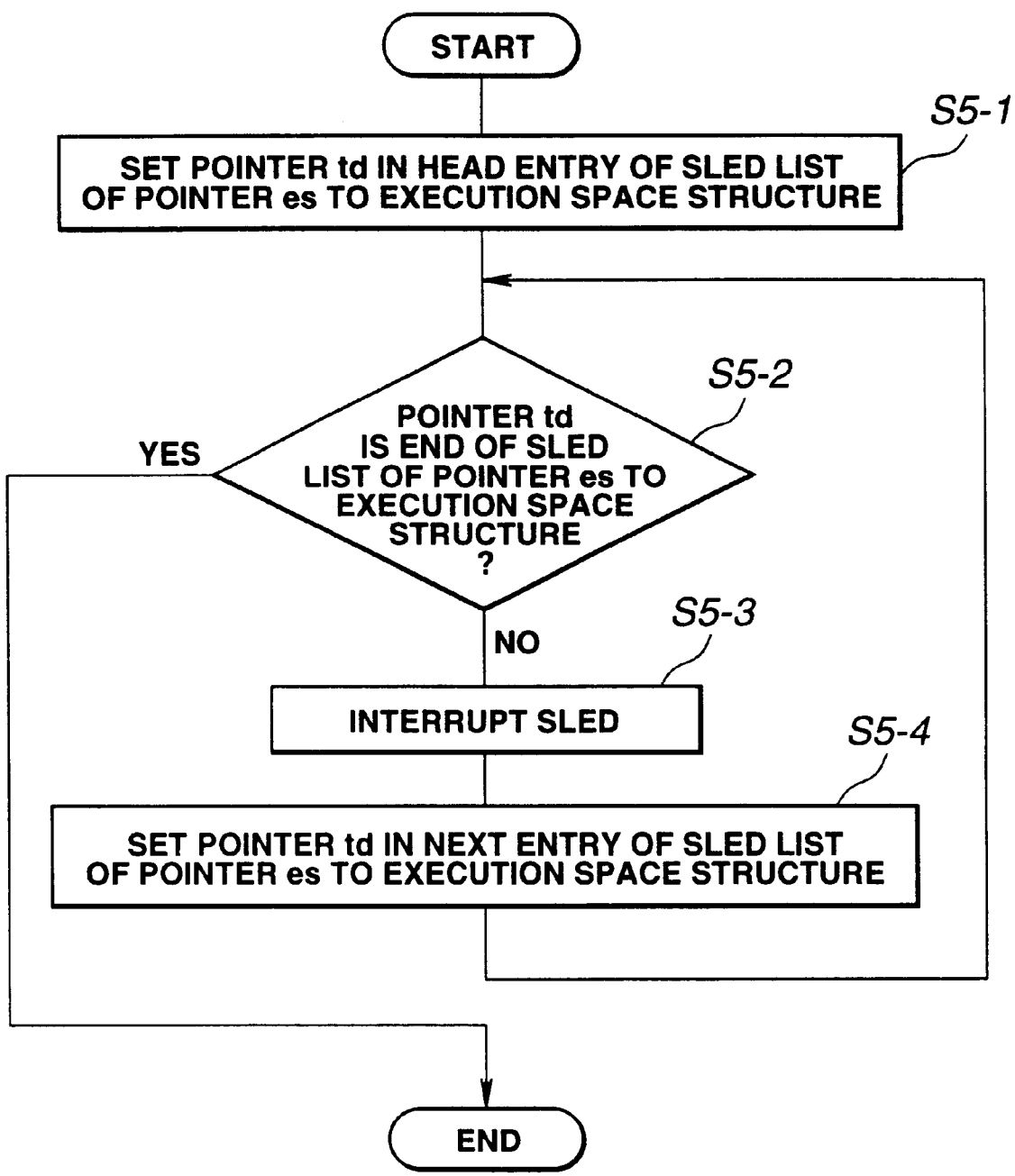
FIG. 14 is a flowchart showing Execution Space Interruption.

When the method Execution Space Interruption is called, as shown in a flowchart of FIG. 14, firstly, in step S5-1, the pointer 'td' to the sled structure is set as the head entry of the sled list of the pointer 'es' to the execution space structure to be interrupted.

Next, in step S5-2, it is determined whether the pointer 'td' set in the previous step is the end of the sled list of the pointer 'es' to the aforementioned execution space structure. Unless the pointer 'td' is the end of the sled list, control is passed to step S5-3 and if the pointer 'td' is the end, the processing is terminated.

In step S5-3, execution of the sled corresponding to the sled structure pointed by the aforementioned pointer 'td' is interrupted.

Next, in step S5-4, the pointer 'td' to the sled structure is set in the next entry of the sled list of the pointer 'es' to the aforementioned execution space structure. After this, control is returned to step S5-2 to repeat the processing.

By the aforementioned processes, execution of all the sleds corresponding to a particular execution space structure is interrupted.

Execution Space Resumption

The method Execution Space Resumption corresponds to a command to specify resumption of execution of a sled corresponding to an execution space structure interrupted by the method Execution Space Interruption, and a pointer 'es' to the execution space structure to be resumed is passed as an argument. That is, when resuming the execution of a sled interrupted by the method Execution Space Interruption, the method Execution Space Resumption is called and the pointer 'es' to the execution space structure to be resumed is passed as an argument.

Figure 15:
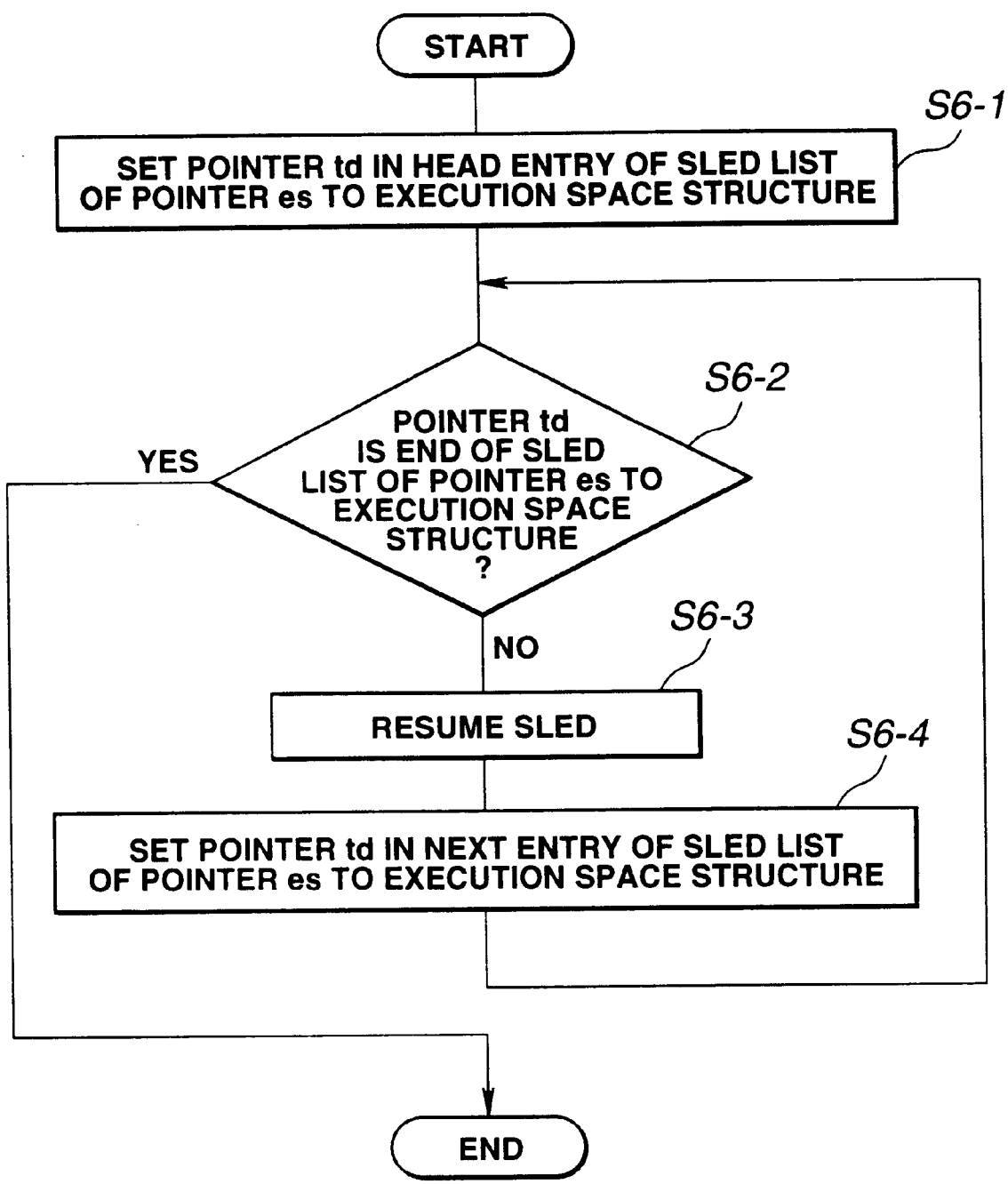
FIG. 15 is a flowchart showing Execution Space Resumption.

When the method Execution Space Resumption is called, as shown in a flowchart of FIG. 15, firstly, in step S6-1, the pointer 'td' to the sled structure is set in the head entry of the sled list of the pointer 'es' to the execution space structure to be resumed.

Next, in step S6-2, it is determined whether the pointer 'td' set in the previous step is the end of the sled list of the pointer 'es' to the aforementioned execution space structure. Unless the pointer 'td' is the end of the sled list, control is passed to step S6-3, and if it is the end of the sled list, the processing is terminated.

In step S6-3, execution of the sled corresponding to the sled structure pointed by the aforementioned pointer 'td' is resumed.

Next, in step S6-4, the pointer 'td' to the sled structure is set in the next entry of the sled list of the pointer 'es' to the aforementioned execution space structure. After this, control is returned to step S6-2 to repeat the processing.

By carrying out the aforementioned processes, execution of all the sleds corresponding to a particular execution space structure is resumed.

Sled Creation

The method Sled Creation corresponds to a command to specify allocation of an area to store a sled information, and a stack size is passed as an argument. That is, when allocating an area to store a sled information, the method Sled Creation is called and a stack size is passed as an argument.

Figure 16:
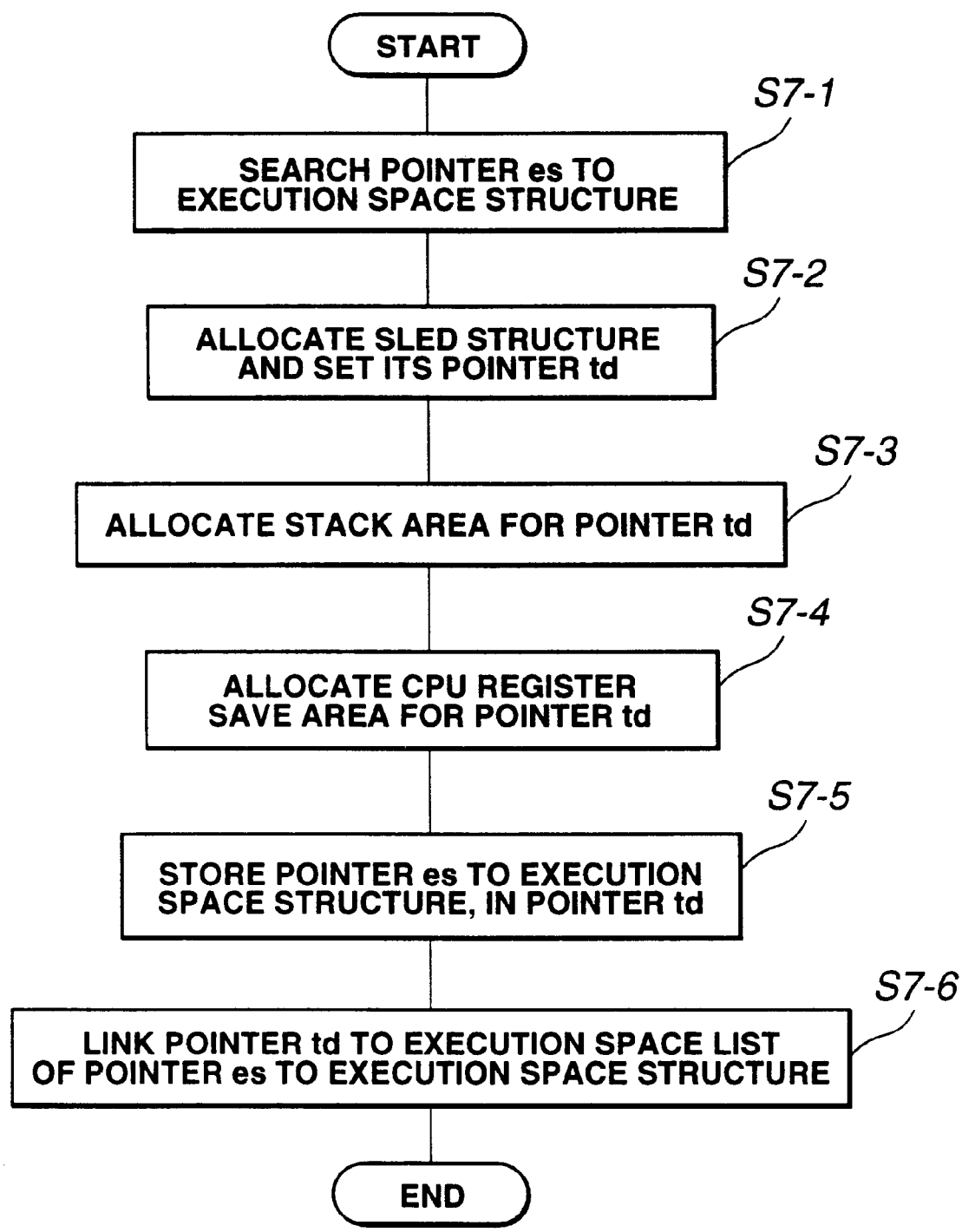
FIG. 16 is a flowchart showing Sled Creation.

When the method Sled Creation is called, as shown in a flowchart of FIG. 16, firstly, in step S7-1, the pointer 'es' to an existing execution space structure is searched to be related to a sled structure to be created by this method Sled Creation.

Next, in step S7-2, a sled structure is allocated as an area to store a sled information and its pointer 'td' is set.

Next, in step S7-3, for the pointer 'td' of the aforementioned sled structure, a stack area of the stack size passed as an argument is allocated.

Next, in step S7-4, for the pointer 'td' of the aforementioned sled structure, a CPU register save area is allocated.

Next, in step S705, the pointer 'es' to the aforementioned execution space structure is stored in the pointer 'td' of the aforementioned sled structure, Next, in step S7-6, the pointer 'td' of the aforementioned sled structure is linked to the execution space list of the pointer to the aforementioned execution space structure.

By the aforementioned processing a sled structure is created to correspond to an existing execution space structure. Here, the execution space structure and the sled structure are interrelated so as to form a so-called list configuration.

Sled Deletion

The method Sled Deletion corresponds to a command to specify release of an area allocated for a sled structure, and a pointer 'td' to the sled structure whose area is to be released is passed as an argument. That is, when releasing an area allocated for a particular sled structure, the method Sled Deletion is called and the pointer 'td' to the sled structure whose area is to be released is passed as an argument.

Figure 17:
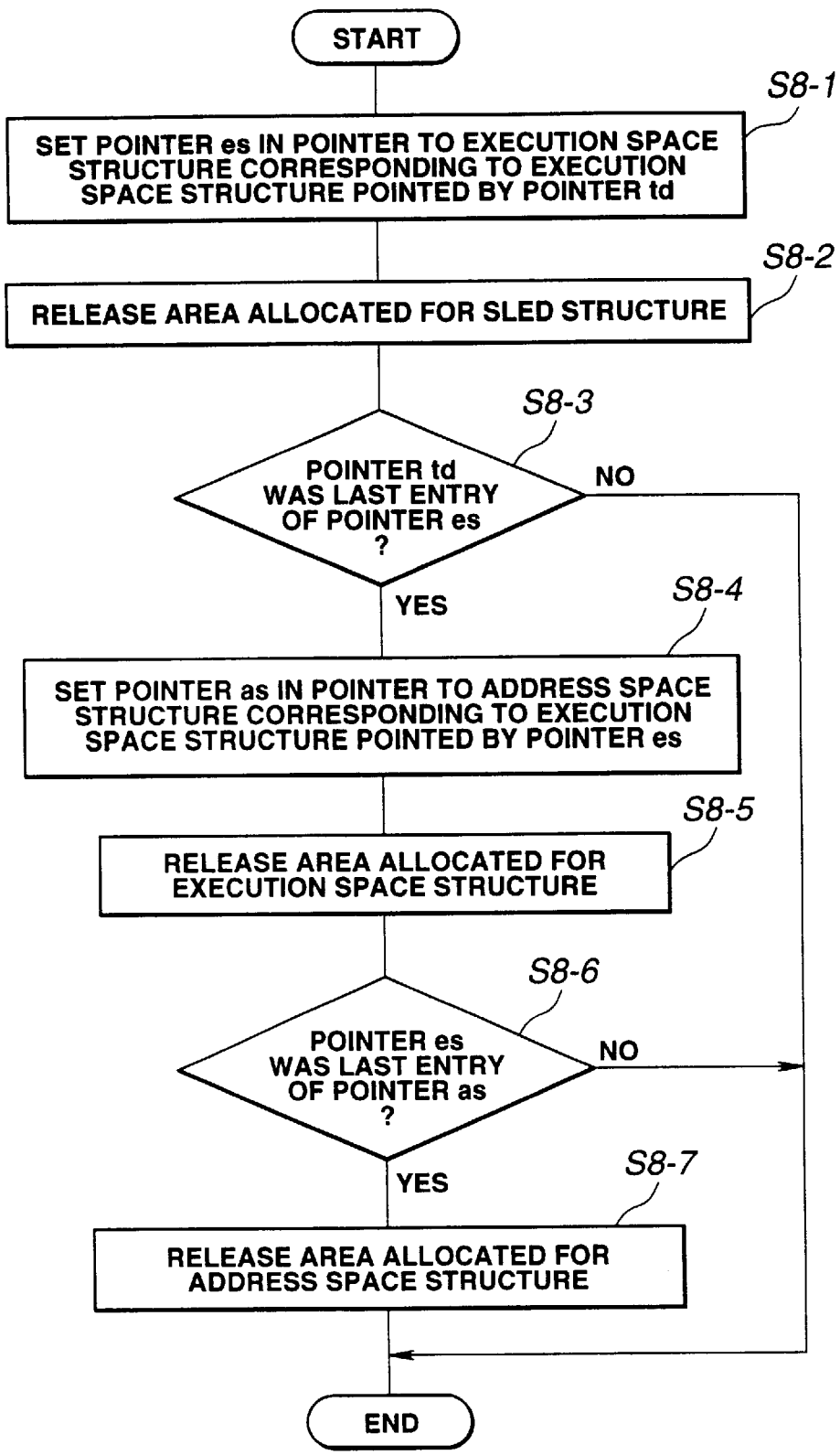
FIG. 17 is a flowchart showing Sled Deletion.

When the method Sled Deletion is called, as shown in a flowchart of FIG. 17, firstly, in step S8-1, a pointer 'es' is set for the pointer to the execution space structure corresponding to the sled structure pointed by the pointer 'td' passed as an argument, i.e., the sled structure whose area is to be released.

Next, in step S8-2, the pointer 'td' passed as an argument, i.e., the area allocated for the sled structure whose area is to be released is released, extinguishing the sled structure. It should be noted that this processing is identical to the processing of the aforementioned steps S2-5-1 to S2-5-4.

Next, in step S8-3, it is determined whether the pointer 'td' to the sled structure deleted in step S8-2 was the last entry of the pointer 'es' set in step S8-1. If it was the last entry, control is passed to step S8-4, and if not the last entry, the processing is terminated.

In step S8-4, a pointer 'as' is set in the pointer to the address space structure corresponding to the execution space structure pointed by the pointer 'es' set in step S8-1.

Next, in step S8-5, the area allocated for the execution space structure pointed by the pointer 'es' set in step S8-1 is released, extinguishing the execution space structure. It should be noted that this processing is identical to the processing of the aforementioned steps S2-6-1 to S2-6-3.

Next, in step S8-6, it is determined whether the pointer 'es' to the aforementioned execution space structure was the last entry of the pointer 'as' set in step S8-4. If it was the last entry, control is passed to step S8-7 and if not the last entry, the processing is terminated.

In step S8-7, the area allocated for the address space structure pointed by the pointer 'as' set in step S8-4 is released, extinguishing the address space structure. It should be noted that this processing is identical to the processing of the aforementioned steps S2-7-1 to S2-7-2. When the area allocated for the address space structure is released, the processing is terminated.

By the aforementioned processing, the area which has been allocated for a sled structure is released and the sled structure is extinguished. Besides, when the sled structure is extinguished and no corresponding sled structures remain in the execution space structure corresponding to this sled structure, the area allocated for the execution space structure is also released and the execution space structure is extinguished. Furthermore, when the execution space structure is extinguished and no corresponding execution space structure remain in the address space structure corresponding to the execution space structure, the area allocated for the address space structure is also released and the address space structure is extinguished.

Thus, when a sled structure is extinguished, there is no danger of remaining of an address structures or an execution space structure which have become unnecessary when the sled structure is extinguished. Consequently, there is no case of allocation of a resource such as a memory for an unnecessary address space structure or an unnecessary execution space structure, thus enabling to effectively use resources.

Sled Interruption

The method Sled Interruption corresponds to a command to specify interruption of execution of a sled corresponding to a particular sled structure, and a pointer 'td' to the sled structure is passed as an argument. That is, when interrupting execution of a sled corresponding to a particular sled structure, the method Sled Interruption is called and the pointer 'td' to the particular structure is passed as an argument.

Figure 18:
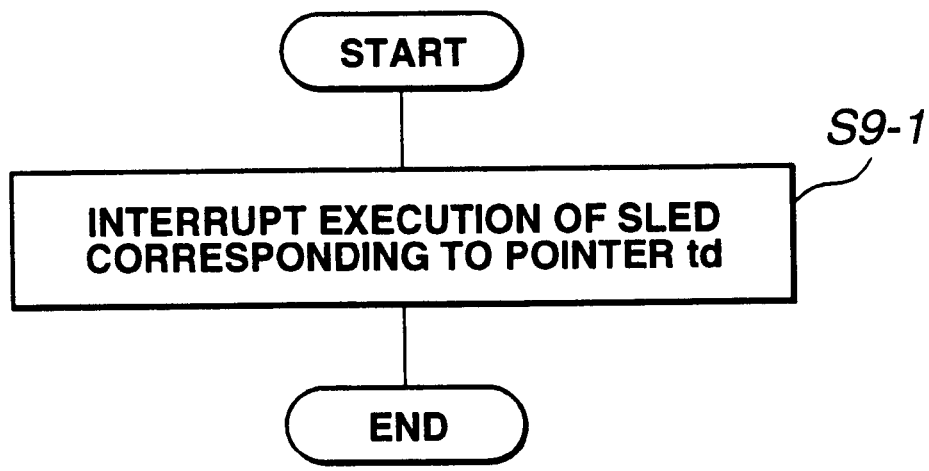
FIG. 18 is a flowchart showing Sled Interruption.

When the method Sled Interruption is called, as shown in a flowchart of FIG. 18, in step S9-1, execution of the sled corresponding to the pointer 'td' passed as an argument, i.e., the pointer 'td' to the sled structure is interrupted. When the execution of this sled is interrupted, the processing is terminated.

By the aforementioned processing, execution of a sled corresponding to a particular sled structure is interrupted.

Sled Resumption

The method Sled Resumption corresponds to a command to specify resumption of execution of a sled corresponding to a particular sled structure interrupted by the method Sled Interruption, and the pointer 'td' to the particular sled structure is passed as an argument. That is, when resuming execution of a sled interrupted by the method Sled Interruption, the method Sled Resumption is called and the pointer 'td' to the sled structure to be handled is passed as an argument.

Figure 19:
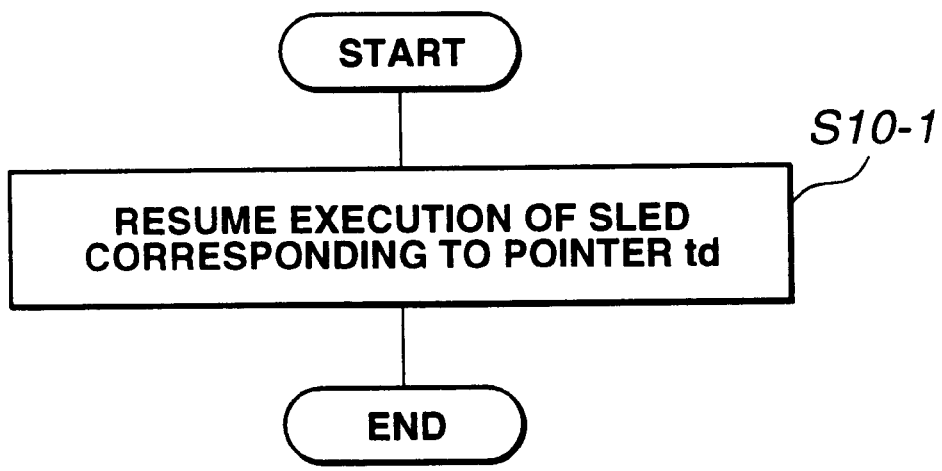
FIG. 19 is a flowchart showing Sled Resumption.

When the method Sled Resumption is called, as shown in a flowchart of FIG. 19, in step S10-1, execution of a sled corresponding to the pointer 'td' passed as an argument, i.e., the pointer 'td' to the sled structure to be handled is resumed. When the execution of the sled is resumed, the processing is terminated.

By the aforementioned processing, the execution of a sled corresponding to a particular sled structure is resumed.

By using the aforementioned methods Address Space Creation, Address Space Deletion, Execution Space Creation, Execution Space Deletion, Execution Space Interruption, Execution Space Resumption, Sled Creation, Sled Deletion, Sled Interruption, and Sled Resumption, it is possible to specify a program execution environment as shown in FIG. 2 and FIG. 3, thus enabling to carry out an effective management of resources used for execution of a program.

As is clear from the above given explanation, according to the present invention, it is possible to carry out an effective management of resources used for execution of a program as follows: an address space structure is allocated as an area to store a logical address; an execution space structure is allocated as an area to store an information of an area for sled execution; and a sled structure is allocated as an area to store sled information. This enables separate management of an area to store a logical address, an area to store information of an area for sled execution, and an area to store a sled information. Moreover, the relationships between the address space structure, the execution space structure, and the sled structure are defined by pointers and accordingly, it is also possible to carry out the management interrelating them with one another.

What is claimed is:

1. A program execution environment specification method for carrying out a command to specify allocation of an area to store a logical address, comprising the steps of:

allocating an address space structure as an address space area to store a logical address wherein the address space area contains a region shared by at least one address space;

allocating an execution space structure as an execution space area to store an information of an area for a sled execution;

storing an address space pointer to the address space structure, in the execution space structure;

linking a first execution space pointer to the execution space structure, to an execution space list of execution space pointers of the address space structure;

allocating a sled structure as a sled area to store a sled information;

storing a second execution space pointer to the execution space structure, in the sled structure;

linking a sled pointer to the sled structure to a sled list of sled pointer of the execution space structure;

interrupting of execution of the sled corresponding to the execution space structure;

resuming of execution of the sled corresponding to the execution space structure interrupted; and deleting address spaces, execution spaces, sleds and regions which correspond to the address space not in use.

2. A program execution environment specification method as claimed in claim 1, further comprising the steps of:

passing a heap area size and a stack size as arguments of said command to specify allocation of an area to store a logical address;

allocating a heap area of said heap area size for said execution space structure; and allocating a stack area of said stack size for said sled structure.

3. A program execution environment specification method as claimed in claim 1, further comprising the step of releasing, if a command to specify release of the address space area allocated for the address space structure is issued, the address space area allocated for the address space structure, the execution space area allocated for the execution space structure pointed by the first execution space pointer linked to the execution space list of execution space pointers of the address space structure, and the sled area allocated for the sled structure pointed by the sled pointer linked to the sled list of sled pointers of the execution space structure.

4. A program execution environment specification method as claimed in claim 1, further comprising the following steps when a second command to allocate a second execution space area to store second information of a second area for a second sled execution is issued:

allocating a second execution space structure as the second execution space area to store the second information of the second area for the second sled execution;

storing a second address space pointer to the address space structure, in the second execution space structure;

linking a third execution space pointer to the second execution space structure, to the execution space list of execution space pointers of the address space structure;

allocating a second sled structure as the second sled area to store second sled information;

storing a fourth execution space pointer to the second execution space structure, in the second sled structure; and linking a second sled pointer to the second sled structure, to a second sled list of sled pointers of the second execution space structure.

5. A program execution environment specification method as claimed in claim 4, further comprising the steps of:

passing a heap area size and a stack size as arguments of said second command to specify allocation of the second execution space area to store the second information of the second area for sled execution; and allocating a heap area of said heap area size for said second execution space structure; and allocating a stack area of said stack size for said second sled structure.

6. A program execution environment specification method as claimed in claim 1, further comprising the following steps when a release command to specify release of the execution space area allocated for the execution space structure is issued:

releasing the execution space area allocated for the execution space structure and the sled area allocated for the sled structure pointed by the sled pointer linked to the sled list of sled pointers of the execution space structure; and releasing, if the first execution space pointer to the execution space structure is a last entry in the execution space list of execution space pointers of the address space structure, the address space area allocated for the address space structure.

7. A program execution environment specification method as claimed in claim 1, further comprising the following steps when an allocate sled area command to specify allocation of a second sled area to store second sled information is issued:

allocating a second sled structure as the second sled area to store the second sled information;

storing a third address space pointer to the existing execution space structure, in the second sled structure; and linking a second sled pointer to the second sled structure, to the list of sled pointers of the execution space structure.

8. A program execution environment specification method as claimed in claim 7, further comprising the steps of:

passing a stack size as an argument of the allocated second sled area command to specify allocation of the second sled area to store the second sled information; and allocating a stack area of said stack size for the second sled structure.

9. A program execution environment specification method as claimed in claim 1, further comprising the following steps when a release sled area command to specify release of the sled area allocated for the sled structure is issued:

releasing the sled area allocated for the sled structure;

releasing, if the sled pointer to the sled structure is a last entry in the sled list of sled pointers of the execution space structure, the execution space area allocated for the execution space structure, and releasing, if the first execution space pointer to the execution space structure is a last entry in the execution space list of execution space pointers of the address space structure, the address space area allocated for the address structure.

10. A recording medium containing a program execution environment specification program for executing following steps when a command to specify allocation of an area to store a logical address is issued:

a step of allocating an execution space structure as an area to store an information of an area for a sled execution;

a step of storing a pointer to the address space structure, in a pointer to an execution space structure wherein the address space area contains a region shared by at least one address space;

a step of linking the pointer to the execution space structure, to a list of pointers to the address space structure;

a step of allocating a sled structure as an area to store a sled information;

a step of storing the pointer to the execution space structure, in a pointer to a sled structure;

a step of linking the pointer to the sled structure, to a list of pointers to the execution space structure;

a step of interrupting of execution of the sled corresponding to the execution space structure; and a step of resuming of execution of the sled corresponding to the execution space structure interrupted;

a step of deleting address spaces, execution spaces, sleds and regions which correspond to the address space not in use.

11. A recording medium as claimed in claim 10 containing said program execution environment specification program, further comprising:

means for passing a heap area size and a stack size as arguments of said command to specify allocation of an area to store a logical address;

heap area allocation means for allocating a heap area of said heap area size for the execution space structure; and stack area allocation means for allocating a stack area of said stack size for the sled structure.

12. A recording medium as claimed in claim 10 containing said program execution environment specification program, further comprising releasing means for carrying out a command to specify release of the address space area allocated for the address space structure, said releasing means including addressing space releasing means for releasing the address space area allocated for the address space structure, execution space releasing means for releasing the execution space area allocated for the execution space structure pointed by the first execution space pointer linked to the execution space list of execution space pointers the address space structure, and sled releasing means for releasing the sled area allocated for the sled structure pointed by the sled pointer linked to the sled list of sled pointers of the execution space structure.

13. A recording medium as claimed in claim 10 containing said program execution environment specification program, further comprising the following for carrying out a second command to allocate a second execution space area to store a second information of a second area for a second sled execution:

second execution space allocation means for allocating a second execution space structure as the second execution space area to store the second information of the second area for the second sled execution;

third storing means for storing a second address space pointer to the address space structure, in the second execution space structure;

third linking means for linking a third execution space pointer to the second execution space structure, to the execution space list of execution space pointers of the address space structure;

second sled allocation means for allocating a second sled structure as a second sled area to store a second sled information;

fourth storing means for storing fourth execution space pointer to the second execution space structure, in the second sled structure; and fourth linking means for linking the second sled pointer to the second sled structure, to a second sled list of sled pointers of the second execution space structure.

14. A recording medium as claimed in claim 13 containing said program execution environment specification program, further comprising:

means for passing a heap area size and a stack size as arguments of said second command to specify allocation of the second execution space area to store the second information of the second area for the second sled execution;

heap area allocation means for allocating a heap area of said heap area size for the second execution space structure, and stack area allocation means for allocating a stack area of said stack size for the second sled structure.

15. A recording medium as claimed in claim 10 containing said program execution environment specification program, further comprising means for carrying out a release execution space command to specify release of the execution space area allocated for the execution space structure, which includes:

execution space release means for releasing the execution space area allocated for the execution space structure and the sled area allocated for the sled structure pointed by the sled pointer linked to the sled list of sled pointers of the execution space structure; and address space release means for releasing, if the first execution space pointer to the execution space structure is a last entry in the execution space list of execution space pointers of the address space structure, the address space area allocated for the address space structure.

16. A recording medium as claimed in claim 10 containing said program execution environment specification program, further comprising means for carrying out a second command to specify allocation of a second sled area to store a second sled information, which includes:

second sled allocation means for allocating a second sled structure as the second sled area to store the second sled information;

third storing means for storing a third execution space pointer to the existing execution space structure, in the second sled structure; and third linking means for linking a second sled pointer to the second sled structure, to the sled list of sled pointers of the execution space structure.

17. A recording medium as claimed in claim 16 containing said program execution environment specification program, further comprising:

means for passing a stack size as an argument of said second command to specify allocation of the second sled area to store the second sled information; and stack area allocation means for allocating a stack area of said stack size for the second sled structure.

18. A recording medium as claimed in claim 10 containing said program execution environment specification program, further comprising means for carrying out a release command to specify release of the sled area allocated for the sled structure, which includes:

sled release means for releasing the area allocated for the sled structure;

execution space release means for releasing, if the sled pointer to the sled structure is a last entry in the sled list of sled pointers of the execution space structure, the execution space area allocated for the execution space structure; and address space release means for releasing, if the execution space pointer to the execution space structure is a last entry in the execution space list of execution space pointers of the address space structure, the address space area allocated for the address space structure.

* * * * *